US012665962B2

(12) United States Patent
Hooton et al.

(10) Patent No.: US 12,665,962 B2
(45) Date of Patent: **\*Jun. 23, 2026**

(54) ELECTRONIC DEVICES WITH DISPLAYS AND CAMERA WINDOWS

(71) Applicant: Apple Inc., Cupertino, CA (US)

(72) Inventors: Lee E Hooton, Massapequa, NY (US); Jia Liu, San Jose, CA (US); Paul Choiniere, Livermore, CA (US); Daniel W Jarvis, Sunnyvale, CA (US)

(73) Assignee: Apple Inc., Cupertino, CA (US)

( \* ) Notice: Subject to any disclaimer, the term of this patent is extended or adjusted under 35 U.S.C. 154(b) by 142 days.

This patent is subject to a terminal disclaimer.

(21) Appl. No.: 18/364,855

(22) Filed: Aug. 3, 2023

(65) Prior Publication Data

US 2024/0098167 A1     Mar. 21, 2024

Related U.S. Application Data

(60) Provisional application No. 63/407,024, filed on Sep. 15, 2022.

(51) Int. Cl.
  *H04M 1/02*       (2006.01)
(52) U.S. Cl.
  CPC ....... *H04M 1/0264* (2013.01); *H04M 1/0268* (2013.01); *H04M 1/0277* (2013.01)
(58) Field of Classification Search
  CPC ............. H04M 1/0264; H04M 1/0268; H04M 1/0277; H04M 1/0266
  See application file for complete search history.

(56) References Cited

U.S. PATENT DOCUMENTS

| | | | | |
|---|---|---|---|---|
| 11,172,110 | B2 | 11/2021 | Akana et al. | |
| 11,672,139 | B2 * | 6/2023 | Jung | H10K 59/8722 |
| | | | | 257/680 |
| 2020/0045153 | A1 * | 2/2020 | Xie | H04M 1/0266 |
| 2020/0307145 | A1 * | 10/2020 | Sargent | B32B 3/04 |
| 2020/0310489 | A1 * | 10/2020 | Spraggs | H04N 23/45 |
| 2021/0168230 | A1 * | 6/2021 | Baker | G06F 1/1635 |
| 2021/0168231 | A1 | 6/2021 | Baker et al. | |

(Continued)

OTHER PUBLICATIONS

Raymond Wong, Smartphone camera bumps, ranked, https://mashable.com/article/smartphone-camera-bumps-ranked, Jun. 18, 2019, Mashable.

*Primary Examiner* — Alison Slater
(74) *Attorney, Agent, or Firm* — Treyz Law Group, P.C.; David K. Cole

(57)     ABSTRACT

Electronic devices may be provided with components such as displays and cameras. A display may be mounted in a housing. The housing may have a sidewall. A bent portion of the display may be embedded in epoxy that is separated from the sidewall by an air gap. Adhesive may attach the epoxy to the housing. A metal support that is chemically bonded to the epoxy may be welded to metal structures such as camera brackets and other metal supports. The housing may have a glass layer that forms a rear wall. The glass layer may have a protruding portion that forms a glass plateau with openings through which cameras operates. A camera may have a protruding portion that is received within one of the glass plateau openings. The protruding portion may extend into a metal camera trim in one of the openings that is attached to the glass plateau.

14 Claims, 5 Drawing Sheets

(56)    References Cited

U.S. PATENT DOCUMENTS

| | | | |
|---|---|---|---|
| 2021/0189240 A1* | 6/2021 | Khan | C09K 19/3003 |
| 2021/0378117 A1 | 12/2021 | Shannon et al. | |
| 2021/0405688 A1 | 12/2021 | Barrett et al. | |
| 2022/0286545 A1 | 9/2022 | Koch et al. | |
| 2023/0384834 A1* | 11/2023 | Park | C09D 183/06 |

* cited by examiner

ELECTRONIC DEVICES WITH DISPLAYS AND CAMERA WINDOWS

This application claims the benefit of provisional patent application No. 63/407,024, filed Sep. 15, 2022, which is hereby incorporated by reference herein in its entirety.

FIELD

This relates generally to electronic devices, and, more particularly, to electronic devices with displays and camera windows.

BACKGROUND

Electronic devices such as cellular telephones include displays and cameras. Displays may be mounted under display cover layers. Cameras may be mounted under camera windows.

SUMMARY

Electronic devices may be provided with components such as displays and cameras. A display may be mounted in an electronic device housing. A bent tail of the display may be embedded in epoxy that is separated from a housing sidewall by an air gap.

Adhesive may attach the epoxy to the housing. A metal support that is chemically bonded to the epoxy may be welded to metal structures such as camera brackets and other metal supports.

The housing may have a glass layer that forms a rear wall. The glass layer may have a protruding portion that forms a glass plateau with openings to receive cameras. A camera may have a protruding portion that is received within one of the glass plateau openings. The protruding portion may extend into a metal camera trim in one of the openings that is attached to the glass of the plateau with epoxy sealant.

A packaged circuit for the electronic device may include multiple printed circuits populated with integrated circuits and other components. The printed circuits may be attached to each other using epoxy encapsulant that covers the integrated circuits.

DETAILED DESCRIPTION

An electronic device may be provided with a display. The display may, as an example, be mounted on a front surface of the electronic device. The electronic device may also have optical components such as cameras. The cameras may operate through camera windows. The camera windows may be formed from openings in a rear housing wall such as a rear glass layer. Sealing and support structures around the display and camera windows and elsewhere in the electronic device may be formed from polymers such as epoxy. The epoxy may be handled at relatively low temperatures and pressures and can form chemical bonds for sealing to glass and metal parts. The epoxy may be used to encapsulate a display tail, may be used as a housing seal that attaches housing structures together, may be used as an integrated circuit encapsulant in a packaged circuit, may be used as sealant to attach a camera trim to a housing wall, may be used to form an epoxy-filled slit between peripheral conductive housing sidewall segments, and/or may be used elsewhere in the electronic device.

Figure 1:
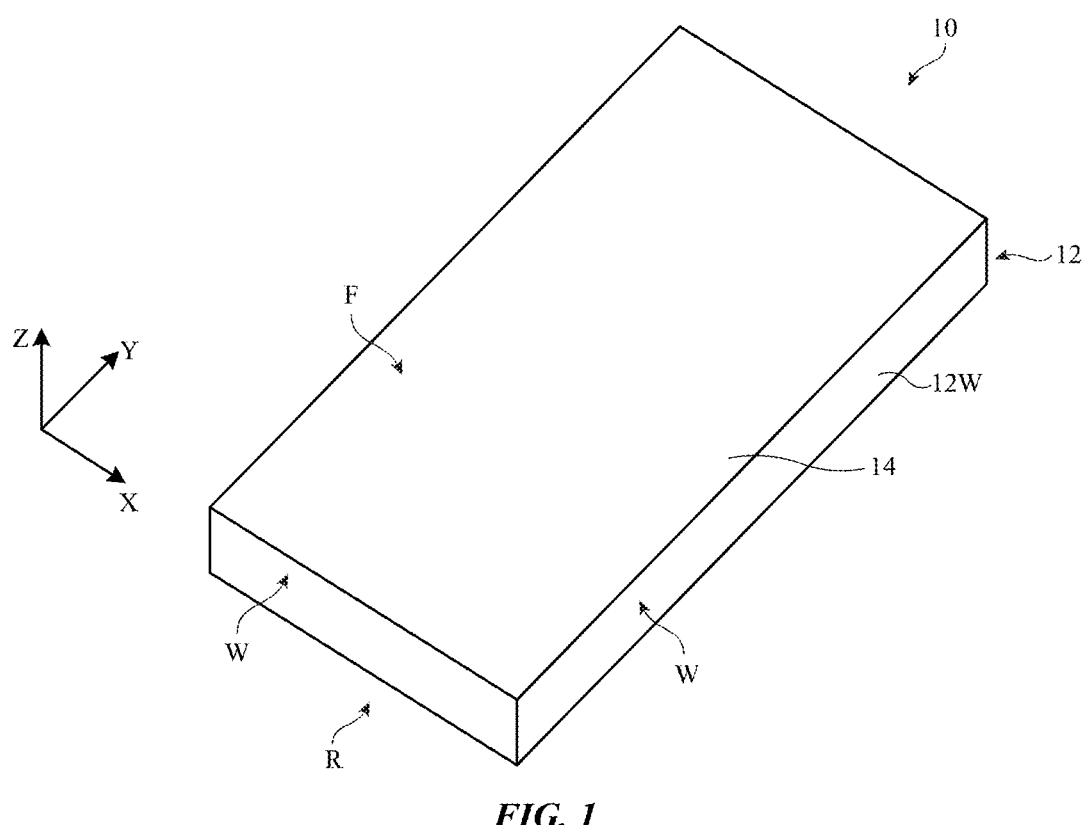
FIG. 1 is a perspective view of an illustrative electronic device in accordance with an embodiment.

FIG. 1 is a perspective view of an illustrative electronic device. Electronic device 10 of FIG. 1 has a front such as front F, an opposing rear such as rear R, and surrounding sides W. Display 14 may be mounted to housing 12 on front F. Housing 12 may be formed from housing walls and other structures of metal, polymer, glass, ceramic, other materials, and/or combinations of these materials. In the illustrative arrangement of FIG. 1, housing 12 includes a peripheral side wall portion 12W that runs around the periphery of device 10. Housing 12 may include a rear housing wall on rear R (e.g., a housing wall formed from glass and/or other suitable housing wall materials). In general, any suitable electronic device may have housing and display structures such as these (e.g., a laptop computer, a wristwatch, a tablet computer, a head-mounted device, etc.). Illustrative configurations in which device 10 of FIG. 1 is a cellular telephone may sometimes be described herein as an example.

Figure 2:
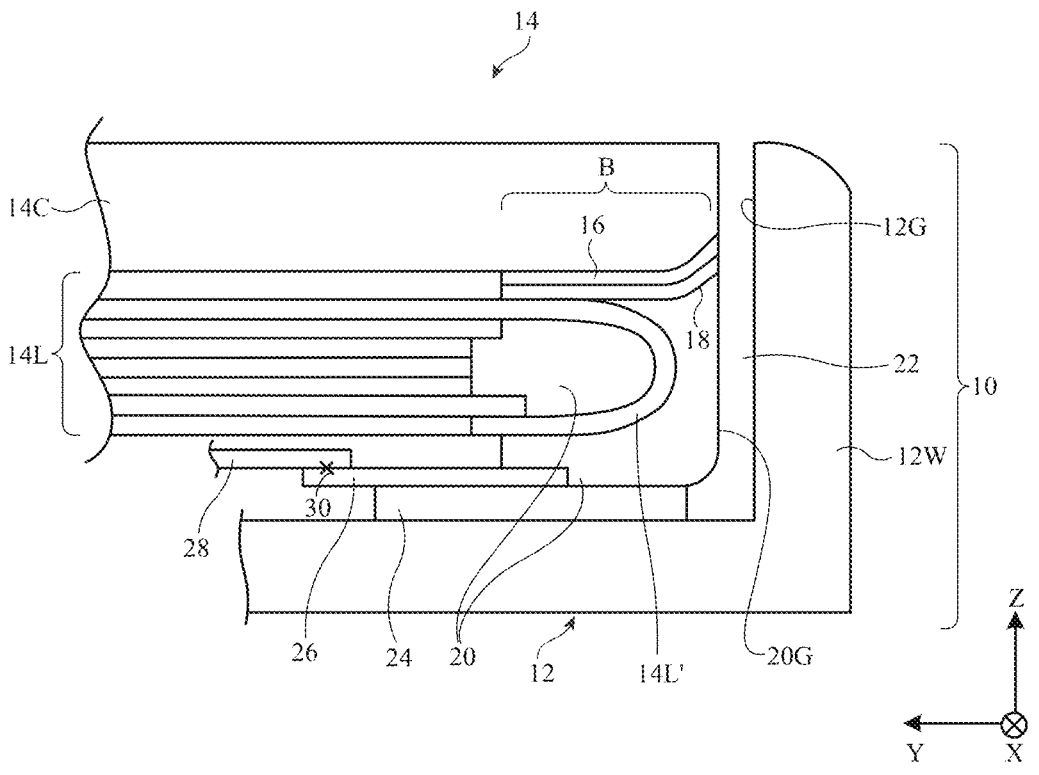
FIG. 2 is a cross-sectional side view of a portion of an electronic device with a display in accordance with an embodiment.

FIG. 2 is a cross-sectional side view of an edge portion of device 10. As shown in FIG. 2, display 14 may include a display panel such as display panel 14L. Panel 14L may include one or more display layers such as a polarizer, a substrate on which thin-film transistor circuitry and thin-film organic light-emitting diode pixels are formed, etc. These display layers may form a pixel array that is configured to display images. The images may be viewed through a transparent protective layer such as display cover layer 14C (sometimes referred to as an upper housing wall or transparent housing wall) that overlaps the layers of panel 14L. A flexible tail portion of display 14 such as tail 14L' may be wrapped back on itself in order to route signal lines on the tail portion to integrated circuits in the interior of device 10. During operation, display driver circuitry and/or other control circuitry in device 10 can supply image data to the pixels of panel 14L over the signal lines on tail 14L'. Tail 14L' may be formed from an integral portion of a display substrate layer in panel 14L (e.g., a polyimide substrate).

To support and protect the edge of display panel 14L, a ring formed from polymer 20 may be formed around the rectangular periphery of panel 14L. This polymer ring may run parallel to the rectangular periphery of front F of device 10. Along the edge of panel 14L that includes tail 14L', some of polymer 20 is formed inside the bent portion of tail 14L'
and some of the polymer 20 is formed outside of the bent
portion of tail 14L'. Surrounding tail 14L' with polymer 20
and thereby embedding tail 14L' within polymer 20 in this
way helps support and protect tail 14L'.

In addition to using polymer 20 to support tail 14L',
polymer 20 may be used as a seal that attaches housing
structures together, may form an integrated circuit encapsu-
lant that encapsulates integrated circuits on printed circuit
boards while attaching the circuit boards together to form a
packaged circuit, may form a gap-filling structure that
attaches housing sidewall segments together, may form a
seal that attaches a camera trim to a glass housing wall,
and/or may be used in supporting and attaching other
structures within device 10. To prevent damage to poten-
tially sensitive structures in device 10 (e.g., to prevent
damage to display layers in panel 14L) and to help attach
polymer 20 to structures in device 10, polymer 20 may be
formed from a thermoset polymer such as epoxy. Epoxy can
be cured using light or heat. In an illustrative configuration,
polymer 20 may be applied using a low injection pressure
(e.g., a pressure of less than 0.5 MPa) at room temperature
(e.g., 20° C.). Injection molding of thermoplastic polymers
typically involves injection pressures of over 150 MPa and
temperatures of over 60° C. By using lower temperatures
and pressures to mold polymer 20 into its desired ring shape
(e.g., temperatures below 40° C., below 30° C., etc. and
pressures below 100 MPa, below 20 MPa, below 3 MPa,
below 1 MPa, etc.) damage to thin metal support structures
and other potentially sensitive structures within device 10
can be avoided.

By using light-based curing for polymer 20, thermal
expansion and contraction effects can be avoided. To support
light-based curing arrangements, the epoxy is provided with
a photoinitiator that is sensitive to light. When light is
applied, epoxy curing is initiated due to the presence of the
photoinitiator. The photoinitiator may be sensitive to ultra-
violet and/or visible light. In an illustrative configuration,
the material of tail 14L' (e.g., polyimide) is transparent to
blue visible light at a wavelength of about 450 nm to 470 nm
(e.g., less than 60% of light at this wavelength is absorbed
when passing through tail 14L'). By incorporating a pho-
toinitiator into the epoxy of polymer 20 that is sensitive to
light with a wavelength of 450 nm to 470 nm (or other
suitable light such as light with a wavelength between 430
nm and 490 nm), light can pass through tail 14L' during
curing, thereby helping to ensure that the portion of polymer
20 that lies within the bent portion of tail 14L' will not be
shadowed by tail 14L' and will therefore be cured satisfac-
torily. Light of a shorter wavelength (e.g., ultraviolet light)
may be prone to absorption in tail 14L', which could lead to
uneven curing of polymer 20.

The peripheral edge of display 14 may be provided with
a ring-shaped opaque border B. Border B may be formed by
depositing one or more opaque (e.g., black) layers of ink 16
on the underside of layer 14C around the periphery of
display 14. Ink 16 may be formed from polyester or other
polymer with opaque colorant (e.g., black dye and/or pig-
ment). Ink 16 may be covered with a layer of epoxy such as
layer 18. Layer 18 may be a thermally cured clear epoxy that
is cured as part of a high temperature curing process used for
curing ink 16. The presence of layer 18 helps promote
subsequent adhesion between polymer 20 and border B.

Polymer 20 may have an outwardly-facing side surface
such as surface 20G and the inner side of housing sidewall
12W may have an opposing inwardly-facing side surface
such as surface 12G. Surfaces 20G and 12G may be separated by air gap 22. Air gap 22 may also separate the side
surface of layer 14C from sidewall 12W. During high stress
conditions such as drop events, the presence of gap 22 helps
prevent hard contact between polymer 20 and sidewall 12W
and helps prevent hard contact between layer 14C and
sidewall 12W, thereby helping to prevent damage during
drop events.

Polymer 20 may be attached to the surface of housing 12
using adhesive 24. Adhesive 24 may be, for example, a
pressure sensitive adhesive such as an acrylic adhesive.
Adhesive 24 may have a ring shape that runs along the
ring-shaped peripheral edge of device 10.

A metal support such as metal support 26 (e.g., a support
forming all or part of a metal ring that runs along the inner
edge of device 10) may be attached to adhesive 24 and may
serve as a support for internal structures in the interior of
device 10. These internal structures may include mounting
structures such as support 28 (e.g., a camera bracket, a
support for a sensor, and/or a support for other components
in device 10). Supports such as support 28 may be welded
to support 26 using welds such as weld 30.

If desired, polymer 20 (e.g., epoxy or other thermoset
polymer molded and cured using low temperatures and/or
pressures) may be used in forming seals, encapsulant, gap-
filling structures, dielectric windows, and/or other structures
in device 10.

Figures 3, 4:
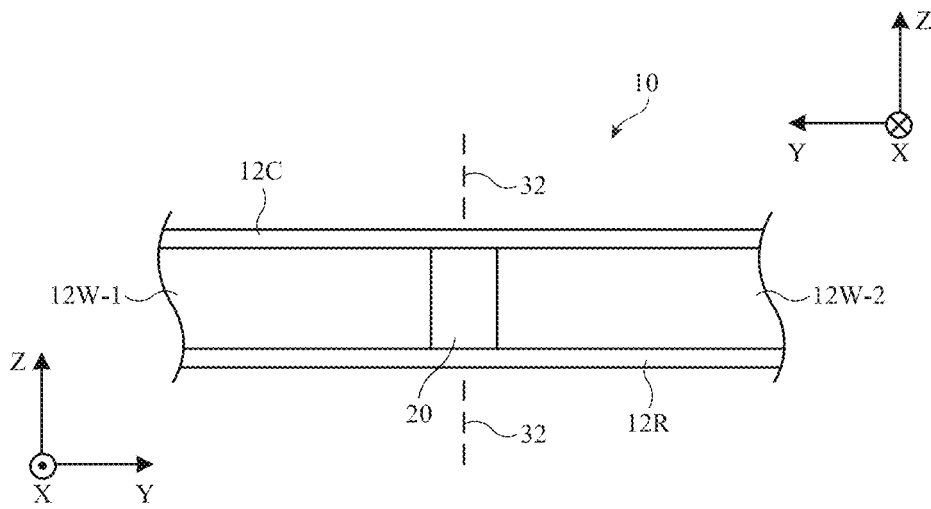
FIG. 3 is a side view of a portion of an illustrative electronic device in accordance with an embodiment.
FIG. 4 is a cross-sectional view of the illustrative electronic device of FIG. 3 in accordance with an embodiment.

In the example of FIG. 3, polymer 20 is used in forming
a slit-filling structure and bond between two opposing
peripheral housing wall segments such as segment 12W-1
and 12W-2 that are separated by a slit (gap). Segments
12W-1 and 12W-2 may be formed in a peripheral conductive
housing sidewall (metal sidewall) of device 10 that allows
these segments to serve as antenna resonators. Polymer 20
may form chemical bonds with stainless steel and/or other
metal or material(s) used in forming housing 12. As shown
in the side view of device 10 of FIG. 3, display cover layer
12C may be mounted on front F (FIG. 1) and a rear housing
wall formed from a layer of glass or other material such as
rear wall layer 12R may be mounted on rear R (FIG. 1). FIG.
4 shows a cross-sectional view of device 10 of FIG. 3 taken
along line 32. At the interfaces between polymer 20 and
housing structures such as sidewall 12W, layer 12C, and
layer 12R of FIGS. 3 and 4, chemical bonds may be formed
between the epoxy of polymer 20 and the glass, metal,
and/or other material of sidewall 12W, layer 12C, and layer
12R. These chemical bonds form seals that resist moisture
ingress without requiring additional application of polymer
sealant coatings. If desired, polymer 20 may form a window
(e.g., a radio-transparent antenna window) in an opening in
a metal housing sidewall portion of housing 12 or in another
opening in a conductive structure in device 10.

Figure 5:
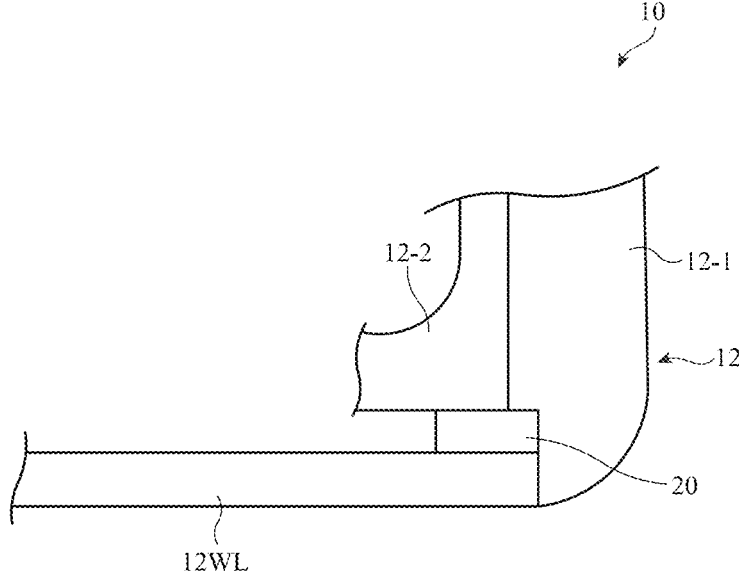
FIG. 5 is a cross-sectional view of a portion of an illustrative electronic device with an epoxy housing seal in accordance with an embodiment.

FIG. 5 is a cross-sectional side view of another illustrative
housing and seal arrangement for device 10. As shown in the
cross-sectional side view of the portion of device 10 of FIG.
5, housing 12 may have portions such as inner portion 12-2
and outer portion 12-1. As with other portions of housing 12,
portions 12-1 and 12-2 may be formed from metal (e.g.,
stainless steel, aluminum, etc.), may be formed from glass,
may be formed from polymer, may be formed from ceramic
and/or other material, and/or may be formed from a com-
bination of two or more of these materials. Portions 12-1 and
12-2, which may form a housing wall or other housing
structure may be attached to housing wall 12WL (e.g., layer
12R, layer 12C, etc.) using a seal formed from epoxy
(polymer 20 of FIG. 5). In this arrangement, chemical bonds
may be formed between polymer 20 and portions 12-1 and
12-2 and wall 12WL, thereby forming a moisture-tight seal without requiring application of additional polymer sealant coatings. In general, polymer 20 (e.g., epoxy) may be used in forming seals between any adjacent portions of housing 12 and/or other structures in device 10. The example of FIG. 5 is illustrative.

Figure 6:
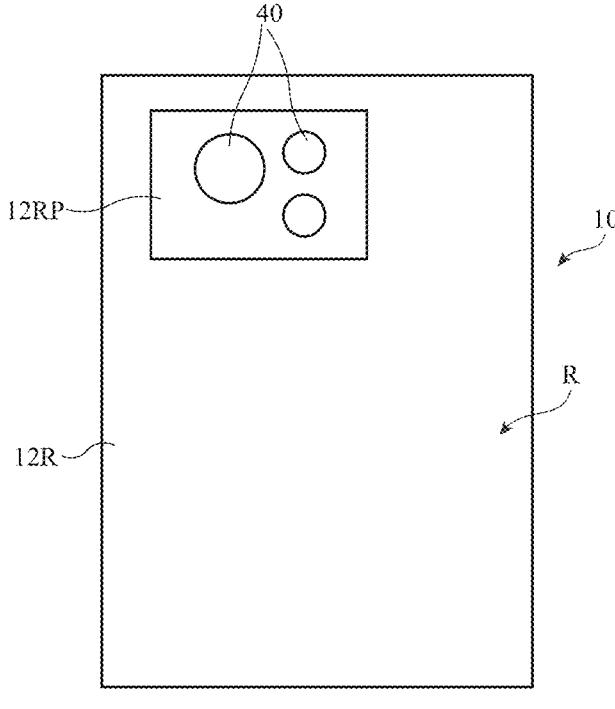
FIG. 6 is a rear view of an illustrative electronic device having a glass rear housing wall with a protruding glass plateau in which openings for cameras are formed in accordance with an embodiment.

If desired, device 10 may have optical windows such as camera windows 40 of FIG. 6. Windows 40 may be formed in region 12RP of layer 12R. Layer 12R may be formed from a material such as glass and, in an illustrative configuration, region 12RP may be formed from a protruding portion of the glass of layer 12R (e.g., a protruding glass plateau).

Figures 7, 8:
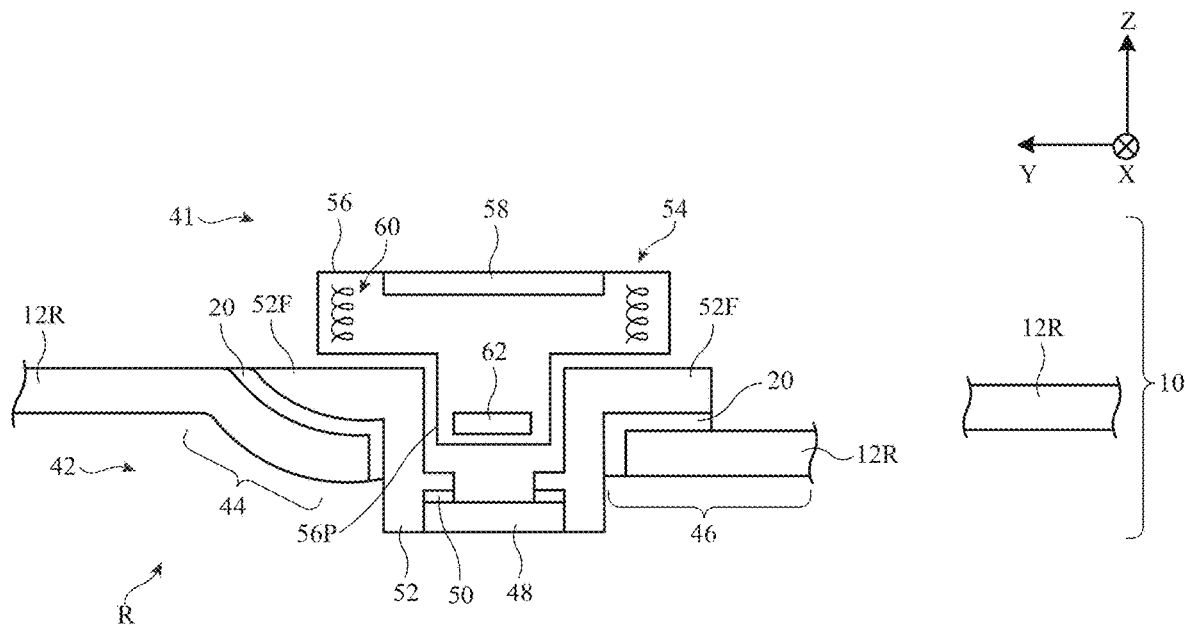
FIG. 7 is a cross-sectional side view of a portion of an illustrative electronic device with a camera window in a glass housing wall in accordance with an embodiment.
FIG. 8 is a cross-sectional side view of an illustrative packaged set of printed circuit boards populated with integrated circuits and other components in accordance with an embodiment.

FIG. 7 is a cross-sectional side view of an illustrative camera window arrangement for device 10 that uses polymer 20 for sealing and that uses a protruding plateau in layer 12R to provide enhanced amounts of interior volume in device 10 for camera resources. As shown in FIG. 7, camera 54 may be mounted in an opening in a housing wall in device 10. In the example of FIG. 7, this housing wall is formed by layer 12R on rear R. Layer 12R (e.g., a glass layer) may separate interior region 41 of device 10 from exterior region 42, which surrounds device 10. Camera 54 may have a housing such as camera housing 56. Camera components such as image sensor 58, lens 62, and lens focusing coils 60, may be mounted in housing 56.

Layer 12R has an opening that receives camera window trim 52. Trim 52 may, as an example, be formed from metal (e.g., stainless steel). A transparent protective camera window cover such as cover 48 (e.g., a layer of glass, sapphire or other crystalline material, polymer, etc.) may be mounted to trim 52. For example, trim 52 may have a ledge to which cover 48 is attached with adhesive 50. In this type of arrangement, polymer 20 may be used as sealing polymer that forms chemical bonds with trim 52 and layer 12R, thereby helping to form a moisture-tight seal that prevents moisture ingress into interior 41 from exterior 42.

The focusing performance and image quality of camera 54 can be adversely affected when insufficient vertical space (distance along the Z axis) is available for coils 60 and housing protrusion 56P. With the arrangement of FIG. 7, the amount of vertical space for camera 54 in interior region 41 is enhanced by creating an outward bulge in layer 12R. As shown in FIG. 7, portions 44 and 46 of layer 12R may protrude outwardly from the rest of layer 12R in the −Z direction. For example, portion 44 of layer 12R may have a bent shape that allows layer 12R to transition between the main portion of layer 12R and a protruding plateau (portion 46). In an illustrative configuration, protruded portion 46 forms a plateau in layer 12R that is at a location that protrudes in the −Z direction from the rest of layer 12R by at least 0.1 mm, at least 0.2 mm, at least 0.4 mm, at least 0.6 mm, at least 0.8 mm, at least 1.0 mm, at least 1.2 mm, at least 1.4 mm, at least 1.6 mm, at least 1.8 mm, less than 4 mm, less than 3.5 mm, less than 3 mm, less than 2.5 mm, less than 2.2 mm, less than 2.0 mm, less than 1.7 mm, less than 1.5 mm, by 0.5-3 mm, by 0.5-2 mm, by 1-3 mm, or other suitable plateau protrusion amount. There may be any suitable number of camera windows in the protruding plateau formed in layer 12R (e.g., at least one, at least two, at least three, one to four, etc.).

FIG. 8 is a cross-sectional side view of an illustrative packaged circuit having multiple printed circuit boards that are attached to each other using polymer 20. Polymer 20 may also serve as an encapsulant for components on the printed circuit boards. As shown in FIG. 8, packaged circuit 70 may include electrical components 74 such as integrated circuits including processors (e.g., a microprocessor, digital signal processor, power management unit, baseband processor, etc.), storage (e.g., dynamic and static random access memory, solid state drive storage, etc.), and/or other integrated circuits, may include discrete components (capacitors, resistors, and inductors), and may include other circuits (e.g., sensors, etc.). Components 74 may be mounted to printed circuit boards 78 (e.g., rigid printed circuit boards formed from fiberglass-filled epoxy or other rigid printed circuit board substrate material). Spacers 76 may include signal paths to couple the signal paths of a first of printed circuit boards 78 to a second of printed circuit boards 78 that is stacked on top of the first board. Optional electromagnetic shielding 72 may be formed over some or all of components 74. Shielding 72 may be a stamped sheet metal structure, may be formed from a metal coating on polymer 20, and/or may be formed from other conductive material. Magnetic shielding may be formed by including ferrite or other magnetic material in shielding 72. To help dissipate heat generated by components 74, polymer 20 of packaged circuit 70 of FIG. 8 may include metal particles and/or other thermally conductive filler to enhance the thermal conductivity of polymer 20.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. An electronic device, comprising:
   a housing;
   a flexible display layer in the housing, wherein the flexible display layer has a bent tail;
   epoxy in which the bent tail is embedded;
   a metal support that is bonded to the epoxy; and
   a weld on the metal support.

2. The electronic device defined in claim 1 further comprising an additional metal support, wherein the weld on the metal support attaches the additional metal support to the metal support.

3. The electronic device defined in claim 2 wherein the housing has a sidewall and wherein the epoxy does not contact the sidewall.

4. The electronic device defined in claim 3 further comprising a transparent display cover layer that covers the flexible display layer, wherein the epoxy and the transparent display cover layer are separated from the sidewall by an air gap.

5. The electronic device defined in claim 4 further comprising adhesive that attaches the epoxy to the housing.

6. The electronic device defined in claim 5 further comprising an opaque border that runs along a peripheral portion of the transparent display cover layer.

7. The electronic device defined in claim 6 wherein the opaque border comprises an opaque polymer layer on a surface of the transparent display cover layer and comprises a clear epoxy layer on the opaque polymer layer and wherein the epoxy in which the bent tail is embedded contacts the clear epoxy layer.

8. The electronic device defined in claim 7 further comprising a packaged circuit having a plurality of printed circuit boards that are attached to each other with epoxy encapsulant.

9. The electronic device defined in claim 8 wherein the housing has first and second conductive peripheral segments separated by an epoxy-filled slit.

10. The electronic device defined in claim 9 wherein the housing has first and second portions joined by an epoxy seal.

11. The electronic device defined in claim 10 further comprising:

a camera trim; and epoxy camera trim sealant.

12. The electronic device defined in claim 11 wherein the housing has a glass rear wall with a rear protruding plateau portion and wherein the epoxy camera trim sealant attaches the camera trim to the rear protruding plateau portion.

13. An electronic device, comprising:

a housing;

a display in the housing, wherein the display has a bent portion; and epoxy in which the bent portion is embedded, wherein the epoxy includes a photoinitiator sensitive at a wavelength between 450 nm and 490 nm.

14. The electronic device defined in claim 13 wherein the housing has a sidewall portion that is separated from the epoxy by an air gap, the electronic device further comprising a metal support that is chemically bonded to the epoxy.

* * * * *